United States Patent [19]

Matsushima et al.

[11] 4,420,115
[45] Dec. 13, 1983

[54] AUTOMOTIVE AIR CONDITIONER

[75] Inventors: Katsuaki Matsushima; Goro Uchida, both of Toyota, Japan

[73] Assignee: Toyota Jidosha Kogyo Kabushiki Kaisha, Aichi, Japan

[21] Appl. No.: 324,413

[22] Filed: Nov. 24, 1981

[30] Foreign Application Priority Data

Apr. 17, 1981 [JP] Japan .......................... 56-55345[U]

[51] Int. Cl.³ .............................................. B60H 1/02
[52] U.S. Cl. ............................... 237/12.3 A; 98/2.05; 236/13
[58] Field of Search ...................... 237/12.3 A, 12.3 C; 98/2.05, 2; 165/42; 236/13

[56] References Cited

FOREIGN PATENT DOCUMENTS 2905612  9/1979  Fed. Rep. of Germany ..... 237/12.3 A

Primary Examiner—Albert J. Makay
Assistant Examiner—Henry Bennett
Attorney, Agent, or Firm—Parkhurst & Oliff

[57] ABSTRACT

An air mixing control type air conditioner used for an automobile for controlling the diffusing air temperature so as to follow a main temperature control at an assistant driver's seat side for a main temperature control at a driver's seat side and to also maintain desired high or low temperature difference with respect to the main temperature control. Thus, the diffusing air temperature of the sub control system following the main diffusing air temperature can be controlled in a range of a predetermined constant temperature difference with respect to the main diffusing air temperature of the main control system. Accordingly, desired automotive cmpartment temperature can be obtained merely by a single main control lever.

2 Claims, 7 Drawing Figures

AUTOMOTIVE AIR CONDITIONER

BACKGROUND OF THE INVENTION

This invention relates to an air mixing control type air conditioner used for an automobile and, more particularly, to improvements in an automotive air conditioner capable of being so controlled as to follow a main temperature control at a left side seat, i.e., an assistant driver's seat side for a main temperature control at a right side seat, i.e., a driver's seat side and also to maintain desired high or low temperature difference with respect to the main temperature control.

Most of air mixing control type automotive air conditioners used heretofore are constructed as shown in FIG. 6. In the air condition of this type, a heater unit 40 is composed of a single heater case 41 in which a single damper 42 is operated to open or close by one control lever 43 thereby controlling the diffusing air temperature from the heater case. Since the temperatures of leftward and rightward diffusing airs into an automotive compartment are equal in this manner, there is no means for responding the requirement that different diffusing air temperatures should be provided to the difference of solar radiation between the left side and the right side of the automotive compartment. In FIG. 6, arrows D, V and H indicate respectively the air diffusing directions of defrosting air, ventilation air and heating air.

There was proposed another air mixing control type air conditioner improved to eliminate the aforementioned disadvantages of the conventional air conditioner as indicated in FIG. 7. In this example, a partition plate 45 is provided in a heater caser 44. Further, a conventional air mixing damper is divided into right and left side dampers 47 and 48 for a single heater core 46, and the right and left side dampers 47 and 48 are individually operated to open or close by right and left control levers 49 and 50, respectively so that the diffusing air temperatures at right and left air diffusing passages 51 and 52, respectively for right and left side seats (driver's and assistant driver's seats) may be independently controlled. The air conditioner of this type still has such a disadvantage that both the control levers 49 and 50 must be operated for the right and left side seats so as to obtain desired room temperature in the entire automotive compartment.

In FIG. 7, arrows $D_R$, $D_L$, $V_R$, $V_L$, $H_R$, $H_L$ indicate respectively right and left side air diffusing directions of defrosting air, ventilation air and heating air.

SUMMARY OF THE INVENTION

It is, accordingly, a primary object of this invention to provide an air mixing control type air conditioner in which all of the aforementioned disadvantages of the conventional air conditioner can be eliminated and diffusing air temperature can be so controlled as to follow a main temperature control at a left seat, i.e., an assistant driver's seat side for the main temperature control at a right side seat, i.e., a driver's seat side.

Another object of this invention is to provide an air mixing control type air conditioner in which diffusing air temperature can be so controlled as to maintain desired high or low temperature difference with respect to the main temperature control.

Yet another object of this invention is to provide an air mixing control type air conditioner in which the diffusing air temperature of both main and sub systems can be controlled merely by a single main temperature control lever by maintaining always a predetermined opening difference between the dampers of the main and sub systems toward opening or closing direction with a sub temperature control lever.

Still another object of this invention is to provide an air mixing control type air conditioner in which diffusing air temperature can be so controlled as to maintain and follow the temperature difference set in a predetermined high or low constant temperature difference width of range from the temperature of the diffusing air of a main system at the diffusing air of a sub system by operating the sub temperature control lever regardless of the temperature of the diffusing air of a main system.

Still another object of the invention is to provide an air mixing control type air conditioner in which diffusing air temperature can be controlled to maintain the automotive compartment at desired temperature merely by a main temperature control lever and to also maintain the diffusing air temperature of the sub system at desired temperature difference with simplicity and accuracy for the temperature control.

According to one aspect of this invention, there is provided an air mixing control type air conditioner in which main and sub controlling functions are provided at a right side seat, i.e., driver's seat side temperature control in such a manner that a right side seat, i.e., driver's seat side air conditioning temperature control is operated as a main function and a left side seat, i.e., assistant driver's seat side air conditioning temperature control is operated as sub function. With this structure the diffusing air temperature of sub control system following the main diffusing air temperature can be controlled in a range of a predetermined constant temperature difference of $\pm t°$ C. with respect to the main diffusing air temperature of a main control system. Thus, when the main diffusing air temperature of the right seat, i.e., driver's seat side is controlled, the sub diffusing air temperature of the left side seat, i.e., assistant driver's seat side can maintain a preselected temperature difference with respect to the main diffusing air temperature, and automatically follow the variation in the main diffusing air temperature by the above control. Consequently, desired automotive compartment temperature can be obtained merely by a single main control lever as in the aforementioned first conventional example and further the sub diffusing air temperature of the left side seat, i.e., assistant driver's seat side can be maintained at a desired temperature difference within a range of $\pm t°$ C. with respect to the main diffusing air temperature of the main control system.

BRIEF DESCRIPTION OF THE DRAWINGS

The above and other related objects and features of the invention will be apparent from a reading of the following description of the disclosure found in the accompanying drawings and novelty thereof pointed out in the appended claims.

DESCRIPTION OF THE PREFERRED EMBODIMENTS

Figure 1:
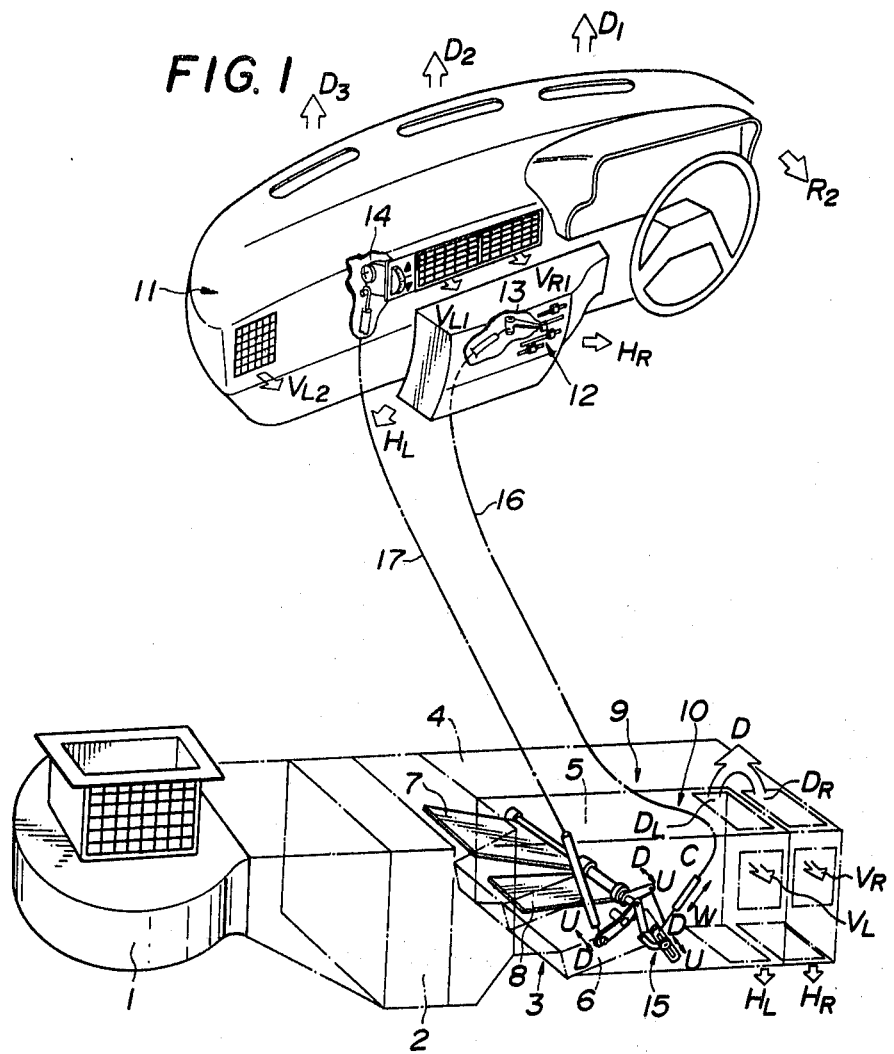
FIG. 1 is a perspective view with a partial cross section of one preferred embodiment of an air mixing control type air conditioner constructed according to this invention together with the air conditioner body.

Reference is now made to the drawings, and particularly to FIG. 1 which shows one preferred embodiment of the air mixing control type air conditioner constructed according to this invention.

Figure 7:
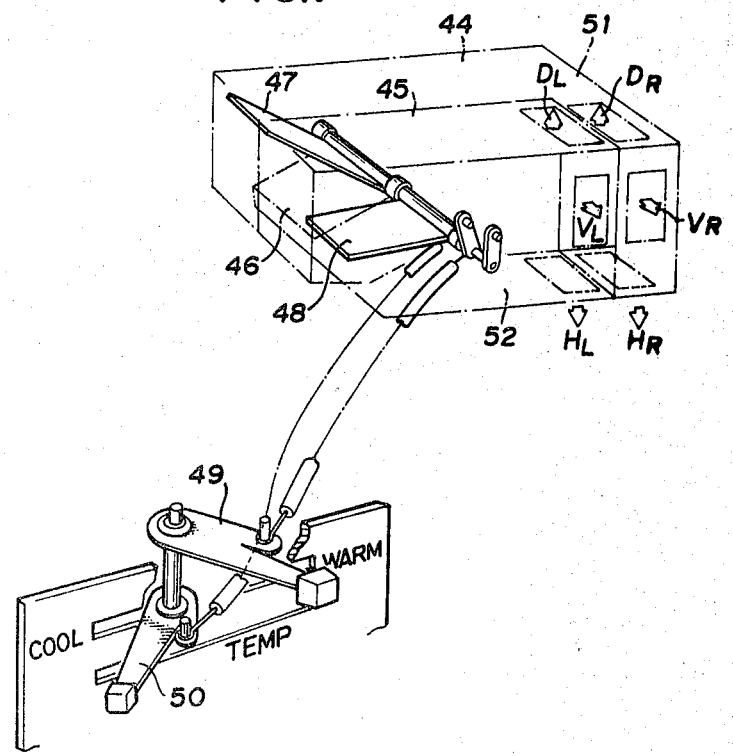
FIG. 7 is a perspective view of another example of the conventional air conditioner.

As shown in FIG. 1, in the air mixing control type air conditioner, a cooler unit 2 and a heater unit 3 are sequentially provided at the downstream of a blower assembly 1. A partition plate 5 is provided for a single heater core 6 of the heater unit 3 within an air mixing heater case 4. Right and left side dampers 7 and 8 for mixing air are provided for the single heater core 6, and air conditioning passage at the downstream of both the dampers 7 and 8 is divided into right and left side passages 9 and 10 as two systems in the same manner as the conventional example shown in FIG. 7.

In the embodiment shown in FIG. 1, the right side system of the right side passage 9 is defined as a main system and the left side system of the left side passage 9 is defined as a sub system.

An air conditioner body shown at the lower half portion in FIG. 1 is contained within an instrument panel 11 in the same manner as the conventional air conditioner. A temperature control lever of a conventional heater control unit 12 is used as a main temperature control lever 13 in this embodiment so as to control the diffusing air temperature of the entire air conditioner, and a sub temperature control lever 14 for a left side seat, i.e., an assistant driver's seat is separately provided so as to control only the diffusing air temperature of the left side seat, i.e., the assistant driver's seat.

Since the main and sub temperature controls are incorporated in the control of diffusing air in this embodiment, a linkage or a link mechanism 15 is associated, as shown in FIG. 1, within the heater case 4. The main and sub temperature control levers 13 and 14 are coupled through cables 16 and 17, respectively to the link mechanism 15, both the right and left side dampers 7 and 8 are operated to open or close by operating the main temperature control lever 13, and the left side damper 8 connected to the left side system is rotated to open or close with respect to the right side damper 7 by operating the sub temperature control lever 14 so as to maintain a predetermined opening difference at the respective opening positions of the right side damper 7 within a range of bidirectional arrows G shown in FIG. 2.

The detailed construction of the link mechanism 15 will be described with reference to FIGS. 2 through 4.

The main temperature control lever 13 is coupled through the cable 16 via a pin 22 to a main lever 18, which is connected to a main shaft 19 in such a manner that the main lever 18 is rotatable around the main shaft 19, on which the right side damper 7 is mounted.

Figure 2:
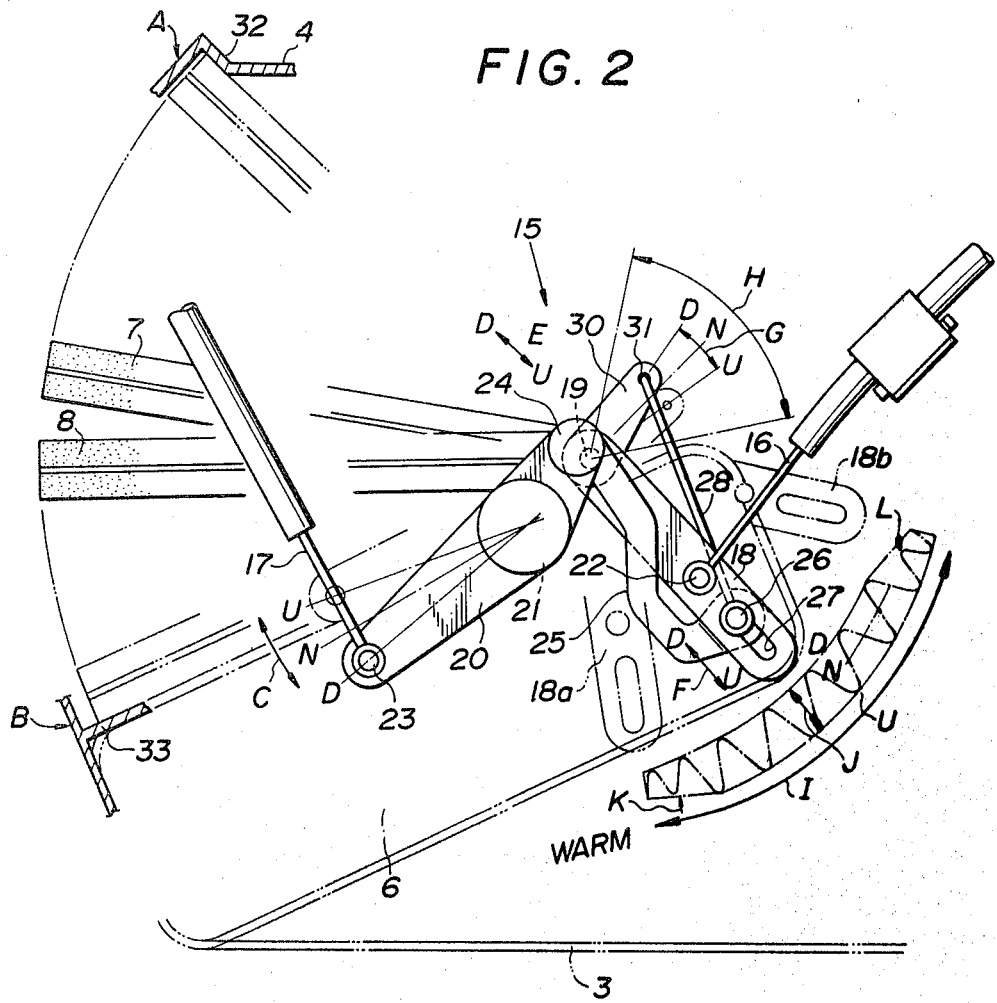
FIG. 2 is a side view of explaining the operation of a linkage of the air conditioner mechanism.

As evidently shown in FIG. 2, the right side damper 7 is rotatable around the main shaft 19 between a fully opened position A and a fully closed position B through the main lever 18. The main lever 18 is disposed at the position designated by 18a at the fully opened position A, and disposed at the position designated by 18b at the fully closed position B.

On the other hand, the sub temperature control lever 14 is coupled through the cable 17 via a pin 23 to a coupling lever 20, which is engaged with a sub mounting shaft 21 in such a manner that the coupling lever 20 is rotatable around the shaft 21. A link 15 is connected at one end via a pin 24 to the opposite end of the lever 20 to the pin 23, and is connected at the other end to a pin 26, which is slidable inserted into a long hole 27 perforated at the main lever 18 in such a manner that the pin 26 may be fixed by pressing within the hole 27 at any position and is rotatably engaged with one end of a rod 28.

Figure 3:
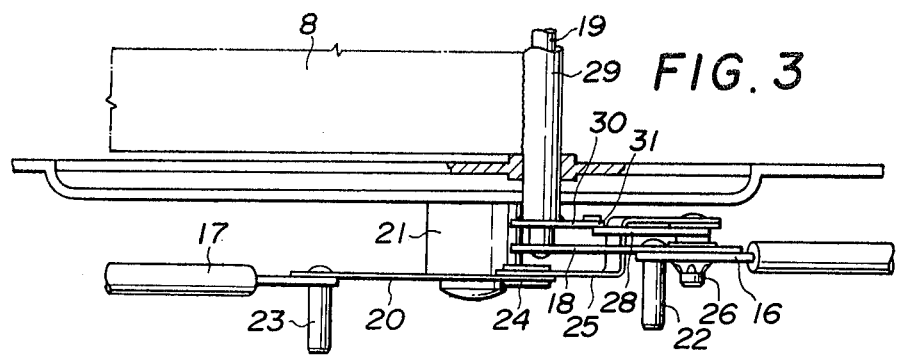
FIG. 3 is a plan view of the essential part of the air mixing control type air conditioner of this invention shown in FIG. 2.
Figure 4:
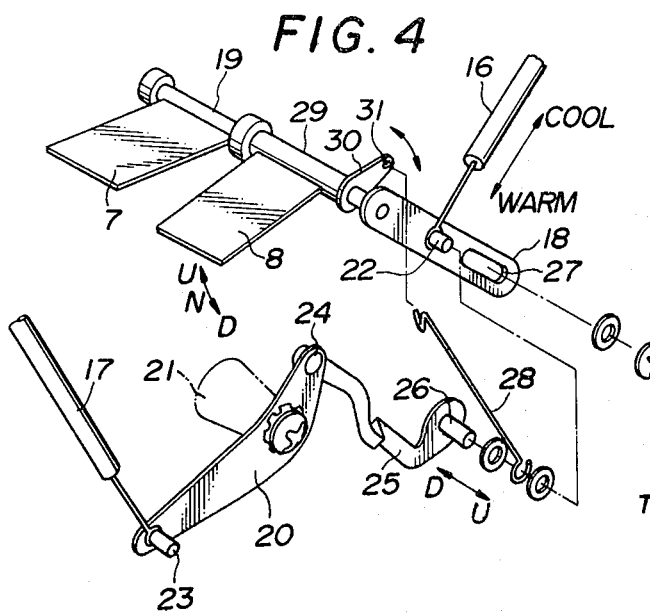
FIG. 4 is an exploded perspective view of the components of the air conditioner mechanism shown in FIG. 2.

The left side damper 8 is connected to a hollow sub shaft 29, as indicated in FIG. 3, into which the main shaft 19 is inserted in the hollow cavity of the sub shaft 29. In this manner, the sub shaft 29 is rotatably coaxially with the axis of the main shaft 19, and a sub lever 30 is fixed to one end of the sub shaft 29. The rod 28 is engaged at the other end with the engaging hole 31 formed thereat.

Since the link mechanism 15 is thus constructed, when the main lever 18 is pivotally rocked around the shaft 19, the sub shaft 29 and the left side damper 8 are simultaneously rotated integrally with the right side damper 7 via the pin 26, the rod 28 and the sub lever 30.

The left side damper 8 may be rotatable in the range from the fully opened position A and the fully closed position B in the same manner as the right side damper 7, and the sub lever 30 may correspondingly be rotatable to the rotating range of the left side damper 8 in a range as indicated by bidirectional arrows H.

The operation of the embodiment of the air mixing control type air conditioner of this invention thus constructed will be described.

Since the cable 16 is moved back and forth longitudinally by the operation of the main temperature control lever 13 as described above with the result that the main lever 18 is pivotally rocked or rotated around the shaft 19 from the position 18a to the position 18b, the right side damper 7 is accordingly rotated in a range from the fully opened position A to the fully closed position B. Since the air passed through the right side passage 9 fully passes through the heater core 6 when the right side damper 7 is disposed at the fully opened position A, it is heated to the highest temperature. Since the air passed through the right side passage 9 does not pass the heater core 6 at all when the right side damper 7 is disposed at the fully closed position B, it is heated least to the lowest temperature.

Turning back to FIG. 1, the air passed through the right side passage 9 is flowed out into the directions as designated by arrows $D_R$, $V_R$ and $H_R$. Further, the cable 17 is moved back and forth longitudinally by the operation of the sub temperature control lever 14 with the result that the pin 23 of the coupling lever 20 is, as indicated in FIG. 2, moved in a range from the maximum opening position U by way of a neutral opening position N to the minimum opening position D as shown by bidirectional arrows C, while the pin 24 is moved in a range of the maximum opening position U and the minimum opening position D as shown by bidirectional arrows E around the sub mounting shaft 21. When the pin 24 is thus moved around the shaft 21, the line 25 is accordingly moved as below.

Since the link 25 is engaged and restricted with the long hole 27 perforated at the main lever 18 at the pin 26 engaged at the other end thereof and the pin 26 is movable in the range of the minimum opening position D by way of the neutral opening position N to the maximum opening position U as designated by bidirectional arrows F within the long hole 27 of the main lever 18, the link 25 is moved in a direction as designated by bidirectional arrows E or F. When the pin 26 is thus moved in the range of the D through N and the U, the sub lever 30 is pivotally rotated or rocket through the rod 28 engaged at one end with the engaging hole 31 of the rod 28 in the range of the D through the N to the U in a direction as designated by bidirectional arrows G.

When the sub lever 30 is thus disposed at the neutral opening position N, the left side damper 30 coupled through the sub shaft 29 to the sub lever 30 is constructed to be opened in the same degree as the right side damper 7 and when the sub lever 30 is disposed at the maximum opening position U, the left side damper 8 is constructed to be opened larger than the right side damper 7. When the sub lever 30 is disposed at the minimum opening position U, the left side damper 8 is constructed to be opened smaller than the opening of the right side damper 7. The rotating range of the left side damper 8 with respect to the right side damper 7 is defined by the length of the long hole 27 may be moved, while the pin 26 engaged within the long hole 27 perforated at the main lever 18 during which the pin 26 may be moved, while the pin 26 engaged within the long hole 27 is fixed by pressing to a predetermined position in the hole 27 unless the sub temperature control lever 14 is not operated.

Accordingly, the position of the pin 26 is not varied even by rotating the main lever 18, and resultantly the relative position of the left side damper 8 with respect to the right side damper 7 does not almost range regardless of the position of the main lever 18, i.e., regardless of the opening of the right side damper 7. As a result, when the left side damper 8 is opened larger than the right side damper 7, the air passed through the left side passage 10 is increased more than the air passed through the right side passage 9 through the heater core 6. Accordingly, the former is heated more through the heater core 6. Thus, the air flowed in a direction as designated by arrows $D_L$, $V_L$ and $H_L$ in FIG. 1 is heated higher than the air flowed in a direction as designated by arrows $D_R$, $R_R$ and $H_R$, and the left side seat, i.e., the assistant driver's seat side is heated higher than the right side seat, i.e., the diver's seat side.

When the opening of the left side damper 8 is smaller than that of the right side damper 7, vice versa, and accordingly the left side seat, i.e., the assistant driver's seat side is less heated than the right side seat, i.e., the driver's seat side. However, the entire temperature rise or fall is controlled by the main temperature control lever 13.

The relationship between the right side damper 7 and the left side damper 8 is indicated by a circular arc diagram shown at the lower right side in FIG. 2. The pin 26 may be movable in a range of the width of the circular arc indicated by bidirectional arrows J (in the same range as the bidirectional arrows F) for the full rotating range of the right side damper 7 as shown by bidirectional arrows I.

Figure 5:
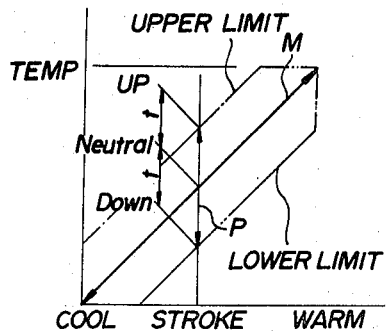
FIG. 5 is a graphical representation of the temperature control characteristic of this embodiment.
Figure 6:
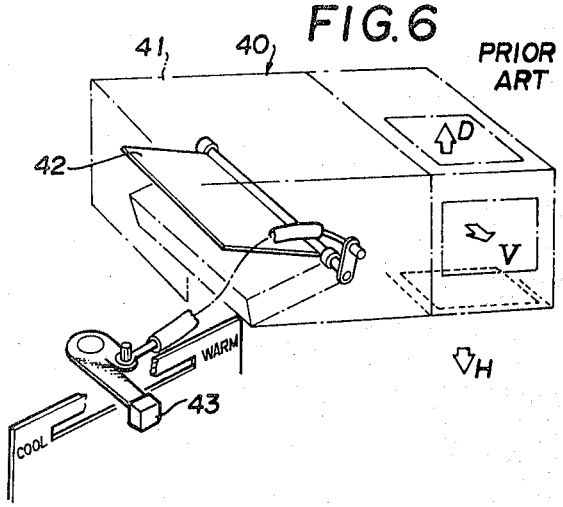
FIG. 6 is a perspective view of the conventional example of the air conditioner.

However, since the left side damper 8 makes contact with an opening position damper stopper 32 of the heater case 4 at the fully opened position of an arrow A in the limiting portion of the width of the circular arc indicated by an arrow K in the lower portion in FIG. 2, the opening of the left side damper 8 will not open larger than that. Similarly, since the left side damper 8 makes contact with an opening position damper stopper 33 of the heater case 4 at the fully closed position of an arrow B in the limiting portion of the width of the circular arc indicated by an arrow L in the middle right side portion in FIG. 2, the opening of the left side damper 8 will not open larger than that. Similar relationship to the above is also shown in FIG. 5. FIG. 5 indicates the relationship with the stroke of the main temperature control lever 13 as abscissae and with the air temperature as ordinates. The temperature of the right side passage 9 is indicated by bidirectional arrows M, while the temperature range of the left side passage 10 is indicated in width by bidirectional arrows P, and the range of the width of the bidirectional arrows P as hatched indicates the temperature controllable range of the left side passage 10.

As apparently indicated in FIG. 2, when the main temperature control lever 13 is operated from the position where the left side damper 8 makes contact with the opening position damper stopper 32 in the state that the left side damper 8 is larger in opening than the right side damper 7 to open the right side damper 7, the contacting reaction force applied to the left side damper 8 by the opening position damper stopper 32 is transmitted through the sub shaft 29, the sub lever 30, the rod 28, the pin 26, the link 25, the pin 24, the coupling lever 20, the pin 23 and the cable 16 to the sub temperature control lever 14, thereby returning the sub temperature control lever 14 to the neutral position.

Similarly, when the left side damper 8 is opened smaller than the right side damper 7 and makes contact with the closing position damper stopper 33, the similar reaction force to the above is transmitted in the same manner as above, thereby returning the left side damper 8 to the neutral position.

It should be noted that though the foregoing description is directed to the construction of the main and sub system. The main system is provided at the driver's seat side of the automobile and the sub system is provided at the assistant seat side in the aforementioned temperature control mechanism, the main and sub systems may also be provided vice versa.

As shown in FIG. 1, the air flow designated by $D_L$ and $D_F$ is integrated to flow as defrosting air indicated by the arrow D as designated by arrows $D_1$, $D_2$ and $D_3$ and the air flow designated by an arrow $V_R$ flows as ventilating air of right side indicated by arrows $V_{R1}$ and $V_{R2}$. Similarly, the air flow designated by arrow $V_L$ flows out as the ventilating air at left side indicated by arrows $V_{L1}$ and $V_{L2}$, and the air flow designated by an arrow $H_R$ flows as the heating air of right side, and the air flow designated by an arrow $H_L$ flows as the heating air of left side usefuly for conditioning the air within the automotive compartment.

It should be understood from the foregoing description that since the air mixing control type air conditioner of this invention is thus constructed and operated, the sub damper of the sub system can be maintained always at a predetermined constant opening difference from the main damper of the main system in opening or closing direction by operating the sub temperature control lever so that the temperature control of the entire system is conducted merely by the operation of the main temperature control lever and the diffusing air temperature of the sub system can be maintained and followed to a selected temperature difference in a range of predetermined constant high or low temperature difference width from the diffusing air temperature of the main system even if the diffusing air temperature of the main system is set at any value with the result that the desired automotive compartment temperature can be set by a single main temperature control lever and the diffusing air temperature of the sub system can be maintained at desired temperature difference, thereby simply and exactly controlling the air conditioning temperature in the automobile.

What is claimed is:

1. An air mixing control type air conditioner comprising:
    a heater core within the air conditioner body having right and left air diffusing ports,
    an air passage divided by a partition plate into right and left side passages to the air diffusing ports of said heater core,
    a main air mixing damper at said one side passage for controlling the air temperature of said one side passage,
    a sub air mixing damper at said the other side passage for controlling the air temperature of said other side passage,
    a main temperature control lever at said main air mixing damper for controlling the diffusing air temperature of said entire air conditioner,
    a sub temperature control lever at said sub air mixing damper for controlling the diffusing air temperature of said one side passage; and
    a link mechanism at said heater core, and said main and sub temperature control levers are coupled to said link mechanism, said link mechanism comprising:
        a main lever rotatably coupled to said main temperature control lever and also to a main shaft in such a manner that said main lever is rotatable around said main shaft, on which said one side damper is rotatably mounted in a range between a fully opened position and a fully closed position,
        a coupling lever rotatably coupled to said sub temperature control lever and engaged with a sub mounting shaft in such a manner that said coupling lever is rotatable around said sub mounting shaft,
        a link connected to said coupling lever at one end and also connected to a pin at the other end, which pin is slidably inserted into a long hole at said main lever in such a manner that said pin is able to be fixed by pressing within the hole of said main lever at any position and is rotatably engaged with one end of a rod, and
        a hollow sub shaft connected to said sub air mixing damper and to which said main shaft is inserted in the hollow cavity thereof in such a manner that said sub shaft is rotatable coaxially with the axis of said main shaft and said sub lever is fixed to one end of said sub shaft.

2. The air conditioner according to claim 1, wherein said link mechanism comprises:
    a main lever rotatably coupled to said main temperature control lever and also to a main shaft in such a manner that said main lever is rotatable around said main shaft, on which said one side damper is rotatably mounted in a range between a fully opened position and a fully closed position,
    a coupling lever rotatably coupled to said sub temperature control lever and engaged with a sub mounting shaft in such a manner that said coupling lever is rotatably around said sub mounting shaft,
    a link connected to said coupling lever at one end and also connected to a pin at the other end, which pin is slidably inserted into a long hole perforated at said main lever in such a manner that said pin is able to be fixed by pressing within the hole of said main lever at any position and is rotatably engaged with one end of a rod,
    a hollow sub shaft connected to said sub air mixing damper and to which said main shaft is inserted in the hollow cavity thereof in such a manner that said sub shaft is rotatable coaxially with the axis of said main shaft and said sub lever is fixed to one end of said sub shaft.

* * * * *